US008527896B2

(12) United States Patent
Matthews et al.

(10) Patent No.: US 8,527,896 B2
(45) Date of Patent: Sep. 3, 2013

(54) USER INTERFACE MENU WITH HOVERING ICONS

(75) Inventors: David Andrew Matthews, Seattle, WA (US); Kanwal VedBrat, Seattle, WA (US); Mark Richard Ligameri, Snohomish, WA (US); Paul Alexander Gusmorino, III, Seattle, WA (US); Charles W Stabb, Seattle, WA (US); Gregory Scott Matthews Melander, Redmond, WA (US); Robert Kenneth Stein, III, Redmond, WA (US); Jenny Lam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1596 days.

(21) Appl. No.: 10/690,816

(22) Filed: Oct. 23, 2003

(65) Prior Publication Data
US 2005/0091609 A1 Apr. 28, 2005

(51) Int. Cl.
*G06F 3/048* (2013.01)
(52) U.S. Cl.
USPC ........... 715/779; 715/711; 715/810; 715/836; 715/860
(58) Field of Classification Search
USPC ................. 715/711, 715, 723, 746, 758, 765, 715/779, 808, 856, 861; 345/473; 382/276; 725/40, 52
See application file for complete search history.

(56) References Cited

U.S. PATENT DOCUMENTS

| 5,303,388 | A | | 4/1994 | Kreitman et al. |
| 5,452,414 | A | * | 9/1995 | Rosendahl et al. ............ 715/836 |
| 5,850,229 | A | * | 12/1998 | Edelsbrunner et al. ....... 345/473 |
| 6,246,406 | B1 | | 6/2001 | Nielsen et al. |
| 6,366,282 | B1 | * | 4/2002 | Trika ............................ 345/423 |
| 6,493,006 | B1 | | 12/2002 | Gourdol et al. |
| 7,003,734 | B1 | * | 2/2006 | Gardner et al. ............... 715/808 |
| 2004/0179043 | A1 | * | 9/2004 | Viellescaze et al. .......... 345/861 |

OTHER PUBLICATIONS

KDE screenshot http://web.archive.org/web/20010808190926/www.kde.org/screenshots/medium/matthiase1.jpg Aug. 8, 2001.*
ObjectDock 0.95 demo video and ObjectDock 0.95 demo video screen capture(http://web.archive.org/web/20030803152245/http://www.stardock.com/video/demo_objectdock.wmv) Aug. 3, 2003.*
KDE feature overview (http://web.archive.org/web/20021216063201/www.kde.org/info/overview.html Dec. 16, 2002.*
Detailed view of fig.1 from the submitted NPL titled "ObjectDock video demo screen capture via waybackmachine . . . " dated Nov. 8, 2006.*
ObjectDock readme file, Jeff Bargmann, Jun. 23, 2003.*
Windows XP screen caps, XP.pdf, 2001, 4 pages.*
M. Yamaguchi, YZ.pdf, Jun. 4, 2003, 11 pages.*
Windows XP screen caps, XPcap.pdf, 2001, 7 pages.*

(Continued)

*Primary Examiner* — Haoshian Shih
(74) *Attorney, Agent, or Firm* — Shook Hardy & Bacon LLP

(57) ABSTRACT

A graphical user interface is provided that has two distinct sections. A first area has an array of menu items. When a menu item is hovered over by a pointer, an icon such as a contextually-related animated icon is displayed on a second area and changes its appearance in such a way as to indicate to the user the location of the pointer and/or the consequence of selecting that menu item.

26 Claims, 12 Drawing Sheets

(56) References Cited

OTHER PUBLICATIONS

Windows XP screen caps, XPcap.pdf, 2001, 8 pages.*

Baker et al., A New Model for Algorothm Animation Over the WWW, ACM Computing Surveys, Dec. 1995, vol. 27 Issue 4, pp. 588-572, ACM Press, New York.

* cited by examiner

USER INTERFACE MENU WITH HOVERING ICONS

BACKGROUND OF THE INVENTION

1. Field of the Invention

The present invention relates generally to graphical user interfaces. More specifically, the invention provides a method for improving a user's visual experience when utilizing an operating system by providing contextual visual feedback indicative of the location of a pointer on a menu and what action will occur if that menu item is selected.

2. Description of the Related Art

In most computer systems of today, the graphics capabilities of the computer are utilized to make the system and programs running on the system easier to use. A program interface that takes advantage of these graphical capabilities is known in the art as a graphical user interface (GUI). The GUI is displayed on a display screen of some sort (such as a monitor or handheld display device, for example). The purpose for implementing a graphical user interface is to allow a computer user to effectively utilize the system without having to learn a complex command language.

Graphical user interfaces are typically made up of several basic components. A basic component of the GUI is the desktop. The desktop is the area on the display screen where icons and other objects such as menus are situated. A GUI will typically have one or more icons situated on the desktop. An icon is a visual representation (usually in the form of a small picture or a small picture accompanied by descriptive text) of a command, a file, or a window in an operating system. A pointing device can be used to move a pointer (also called a cursor) to the icons. Examples of pointing devices are a mouse, a trackball, a stylus, or any other pointing devices as are known in the art. When a cursor is moved over an icon, a user can press a mouse button or some other actuating device to cause the system to execute a command or convert the icon into a window. A window is a discreet area of the display in which a user can run a program or display a file. Windows can be moved about the display device and they can be resized and reshaped to provide a better layout for the user. Many GUIs also provide for command menus. Command menus allow a user to execute a command by selecting some choice from a menu that is displayed on the GUI. An example of a prior art command menu is shown in FIGS. 2 and 3. In FIG. 2, a depiction of the Microsoft Windows® operating system environment, a start menu is provided in which a user moves the pointer 202 over a button (e.g. icon) 200 and activates the button to display a menu of commands and options available to the user. The entire menu is shown in FIG. 3, and it is typically known as a Start Menu 300. Other examples of menus include dropdown menus that appear when the user clicks on a choice located in the menu bar of a software application such as Microsoft Word®.

In reference to FIG. 3, it is well known that graphical user interfaces utilize various techniques to indicate to the user that the pointer 202 is located over a specific area of the desktop. In one known technique, when a mouse is located over an icon or menu item for more than a short period of time something known as a tool tip 204 is presented to the user. The tool tip 204 displays information about the icon after the mouse has hovered over the icon for a certain amount of time. In the FIG. 3 provided, the pointer is located over the "Windows Update" menu item 304. The tool tip 204 for "Windows Update" is displayed, and the user knows that the mouse is presently over that particular icon and is further provided with information pertaining to the event or command that will be executed if the user chooses to select that particular icon or menu item.

Changing the shape of the cursor/pointer is another known technique utilized to indicate to a user that the mouse pointer 202 is located over a particular icon, link, or menu item. When the cursor moves over a particular link or icon, the cursor changes from its typical shape to another shape such as a representation of a hand. An example of this technique is provided by a user viewing a web page through an Internet browser. When the pointer moves over an active hyperlink, it changes from its typical arrow to the shape of the hand, indicating to user that the pointer is located over the active hyperlink.

In another known visual feedback technique, the background of a selected menu item is changed from one color to another when the cursor is moved over it. Referring again to FIG. 3, in known operating systems such as those in the Microsoft Windows® brand family, the user interface includes a start menu 300. The start menu is normally hidden from the user until the user clicks on a start button 200 located somewhere on the interface. When the start button 200 is activated, a start menu 300 pops up in a layer that is on top of everything else displayed on the desktop. As the cursor moves over each menu item 306, its background changes color—typically from a light colored background with dark colored text, to a dark colored background with a light colored text (as shown by the "Windows Update" menu item 304). This technique provides the user with an indication of where the pointer is located, and as a result, demonstrates the action that would take place if the menu item were to be selected by actuating the pointing device.

In another known visual feedback technique, simulated three-dimensional depictions are used to bring forward a menu item over which the pointer is located. Referring to FIG. 4, an application toolbar 400 is shown with several toolbar menu items. As the cursor moves over a particular toolbar menu item, the menu item appears to be either depressed or raised from the rest of the visible start menu. This raised effect can be seen in the "Excel" menu item 402. This technique also provides the user with a visual aid to show that a particular menu item can be selected by clicking or depressing the pointing device.

Although known graphical user interfaces attempt to provide the user with sufficient feedback to determine the location of the pointer, cursor or other pointing device, it is desirable to provide an improved and/or alternative graphical user interface that makes it easier for users to determine the exact location of the pointer and what will happen if the icon or menu item over which it is located is selected.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, an aspect of the present invention is directed to a method and apparatus for providing visual feedback to a user of a graphical user interface. An aspect of the invention further provides an enriched user experience by placing operating system specific functions in a distinct part of the graphical user interface, while placing other commands that are application specific into a different part of the graphical user interface.

Another aspect of the invention provides for a computer generated user interface for accepting user input commands. The interface includes an area that has a plurality of menu items. Based on the location of a pointer, an icon is selected from a set of icons and is displayed in a second area.

A further aspect of the invention provides a method of providing visual feedback in a graphical user interface. The method involves receiving user input that causes a pointer to hover over a menu item. In response to that input, an icon associated with that menu item is displayed.

Another aspect of the invention provides a computer generated interface that accepts user input commands. The interface has a menu divided into a first section and a second section. Each operation that can be selected from the first section of the menu is an operating system specific function.

Yet another aspect of the invention provides for computer generated user interface for accepting user input commands. The interface includes a pointer for selecting menu items and icons. The user interfaces includes a start menu divided into two columns, with a first column having commands that are specific to the operating system only, while a second column has commands that allow the user to launch and control application programs that are not part of the operating system. The start menu further provides, for each item on the operating system specific side of the start menu, a contextual indication of the item over which the pointer is located at a given time. The contextual indicator may be an animated icon that displays content that is relevant to an operating system function.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
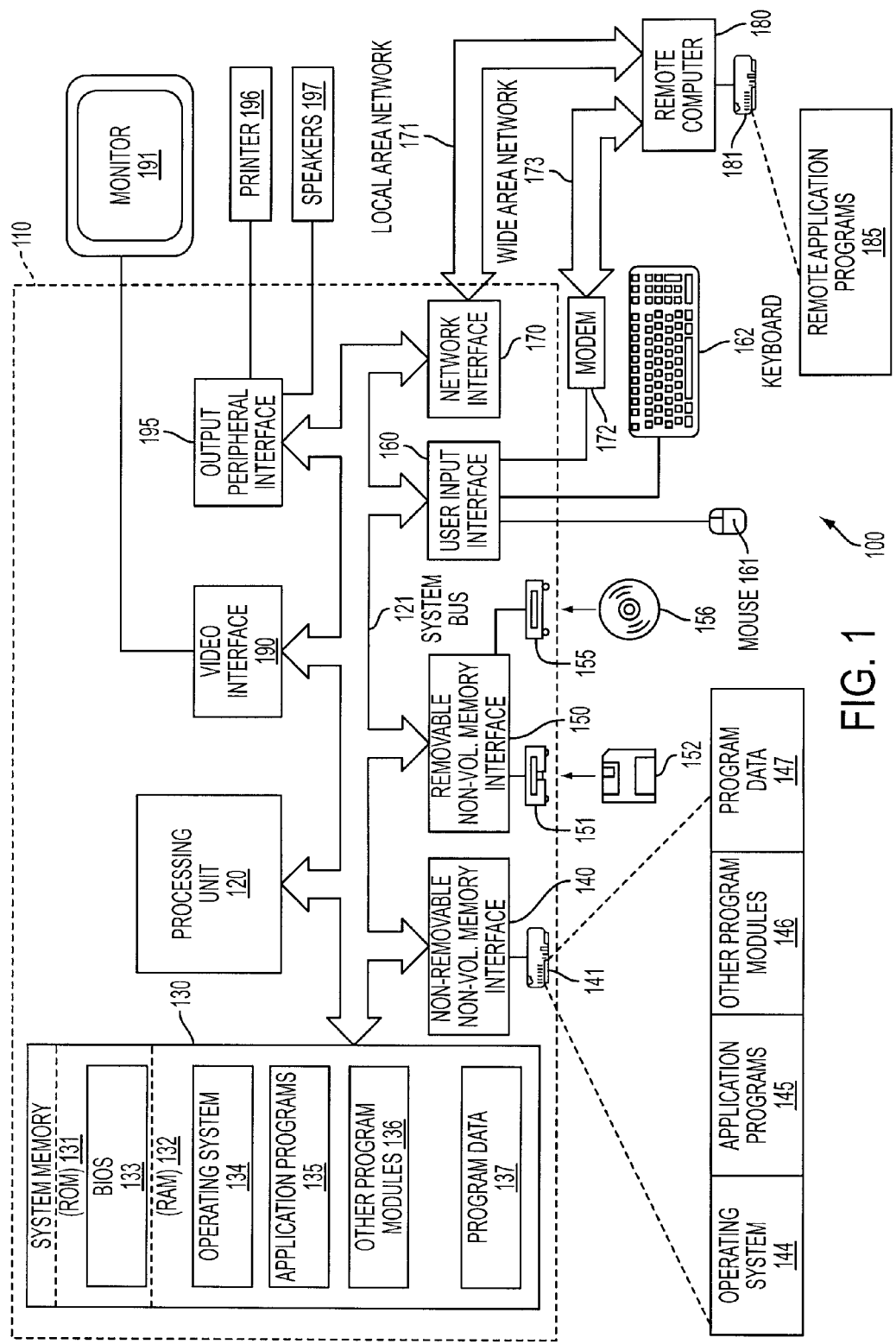
FIG. 1 illustrates a schematic diagram of an exemplary general-purpose digital computing environment that may be used to implement various aspects of the present invention.
Figure 2:
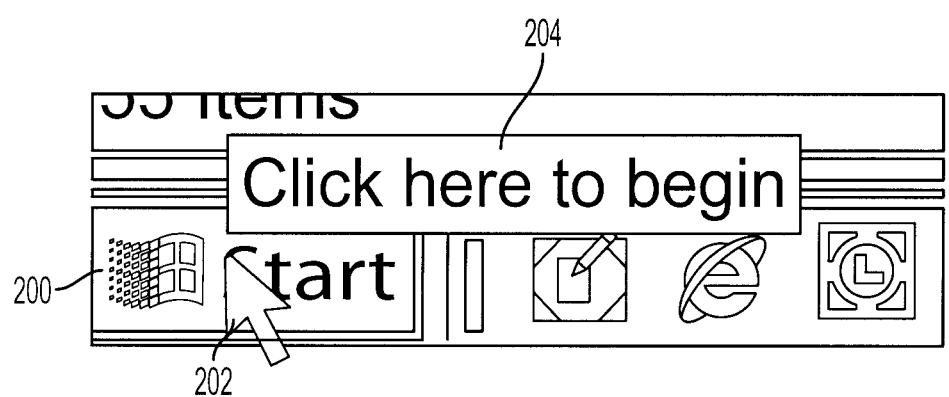
FIG. 2 illustrates a prior art menu button with a pointer and a tool tip.
Figure 3:
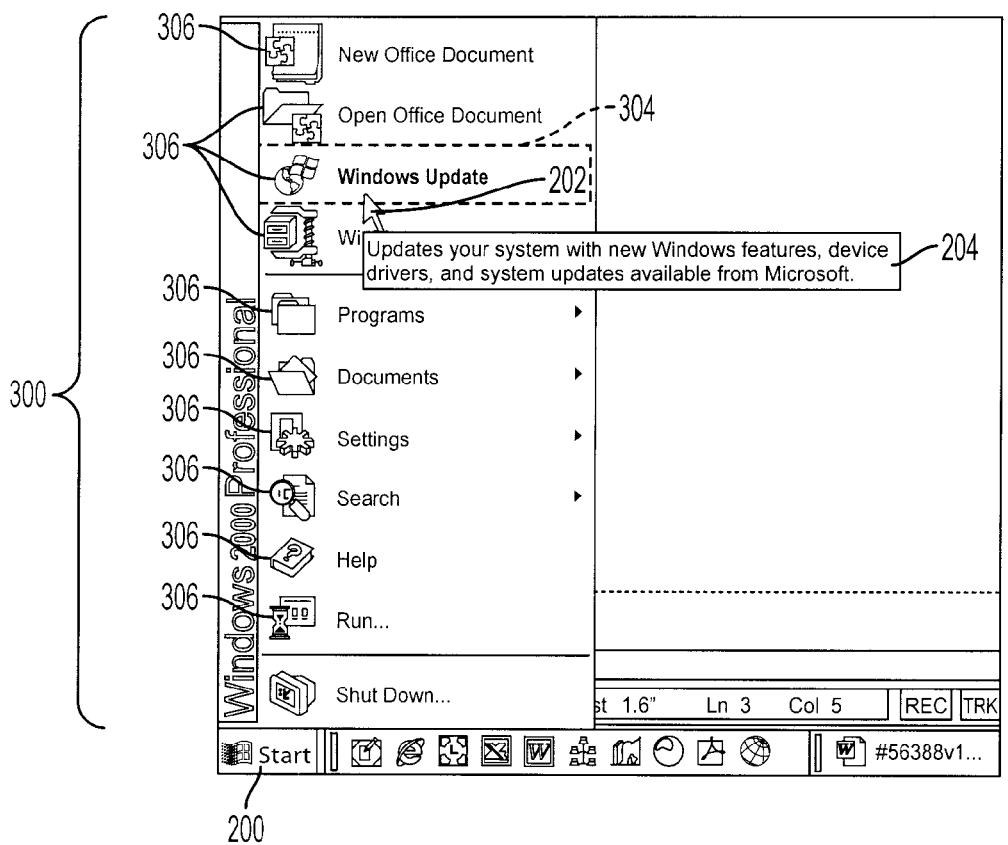
FIG. 3 illustrates a prior art start menu with a pointer and a tool tip that utilizes a change of background color to indicate the location of the pointer.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. Computer 110 may also include a digitizer 192 for use in conjunction with monitor 191 to allow a user to provide input using a stylus input device 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

DESCRIPTION OF ILLUSTRATIVE
EMBODIMENT(S)

Figure 5A:
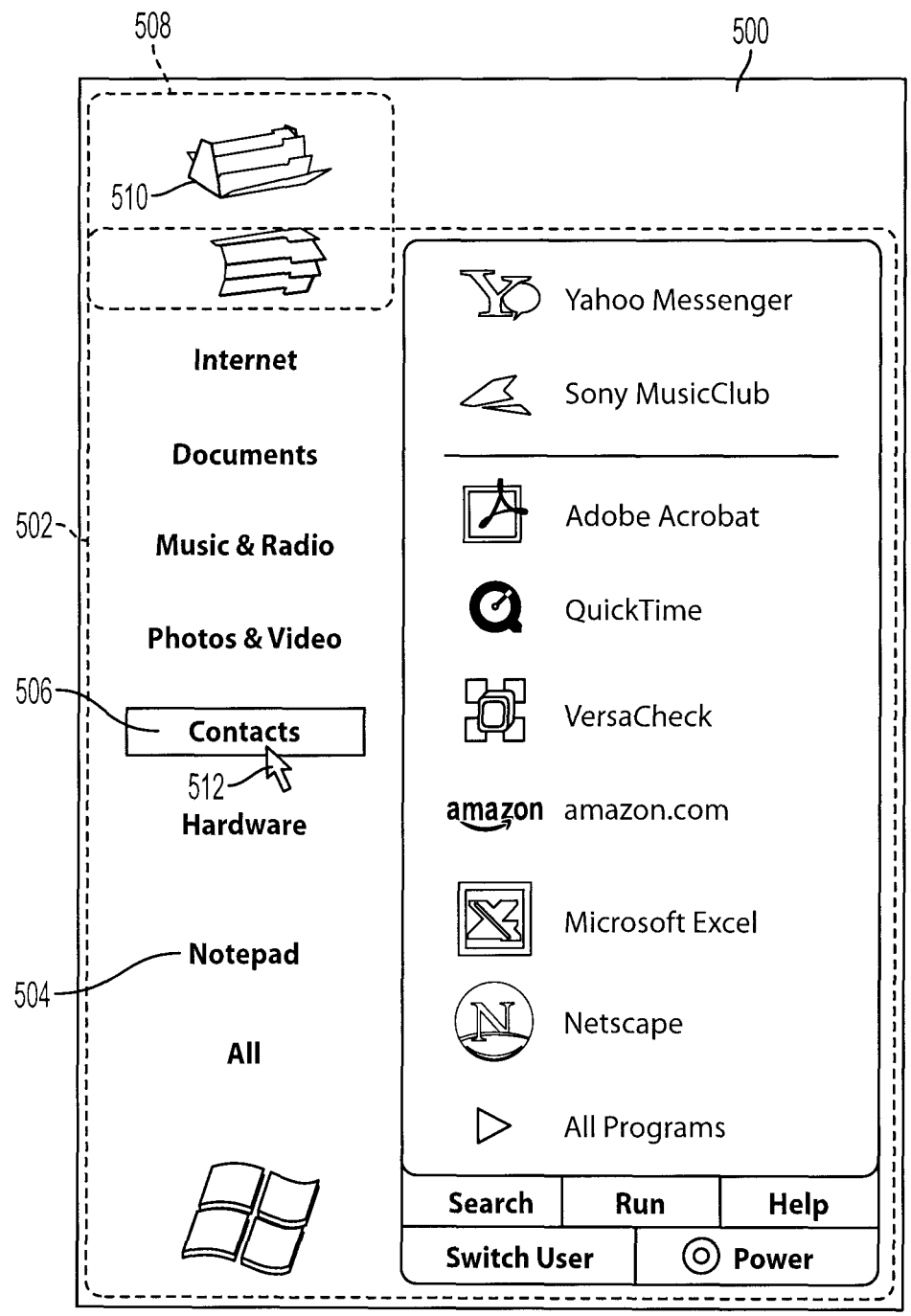
FIG. 5 illustrates the animation of a visual element in accordance with aspects of the present invention.
Figure 5B:
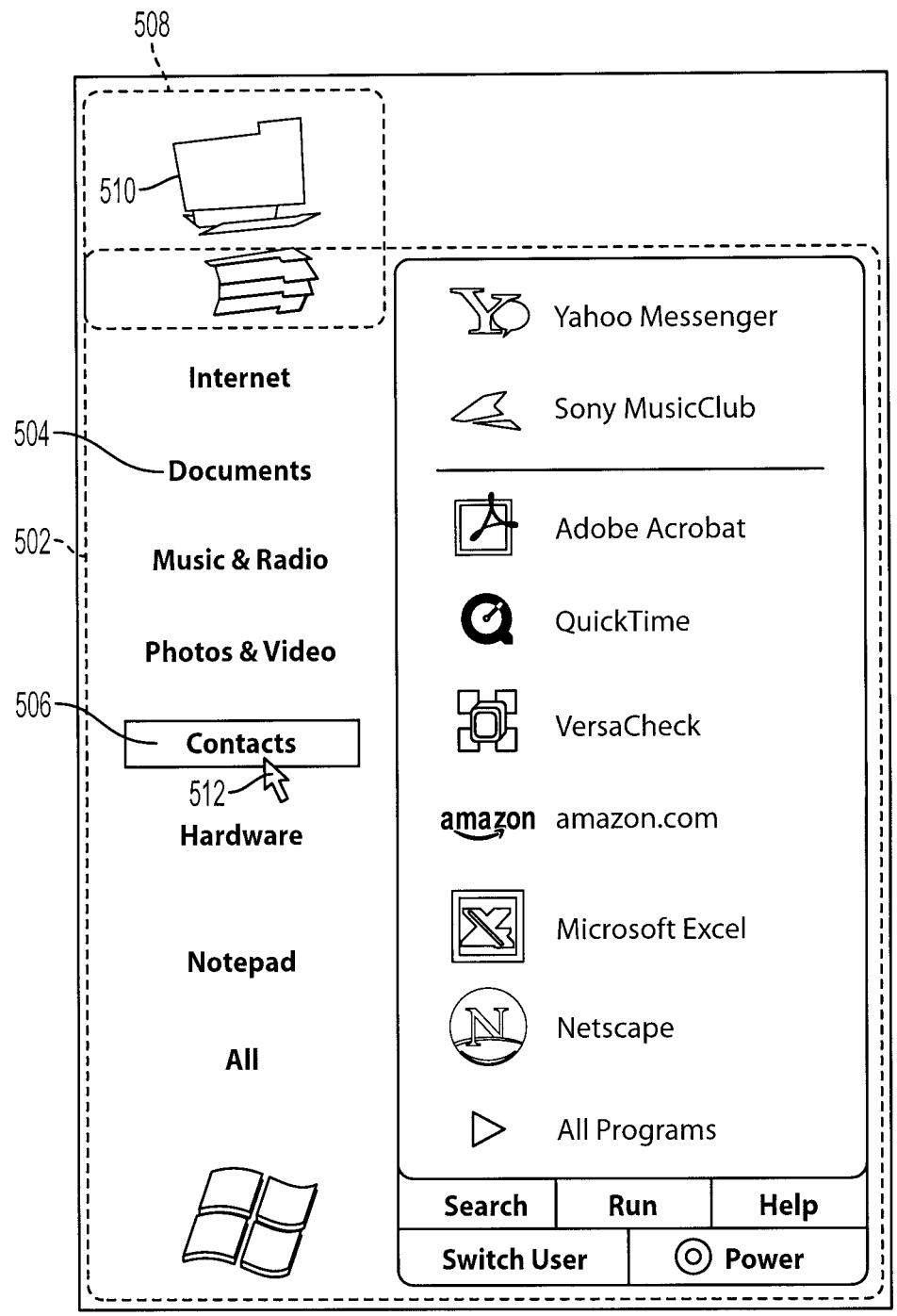

Referring to FIG. 5a, a portion of a computer generated user interface 500 is shown. The computer generated interface 500 accepts user input commands from some input device, for example a computer mouse that controls a pointer 512. The computer generated user interface 500 has a first area 502 that has a plurality of menu items 504. The first area 502 may be a start menu or possibly some other menu as is known in the art. A second area 508 is shown. Located on the second area 508 is icon 510. Animated icon 510 may be created utilizing graphics software application programs such as PaintShop Pro, Photoshop, discreet 3ds max, Alias Maya® or some other known graphics development tools. An animated icon could be an animated version of a common graphics file format such as an animated ".gif" file, or it could be an object defined in the shell namespace API. Although an animated icon is shown in FIG. 5a, this icon may also be a static icon. The static icon could be created in several well-known file formats such as ".jpeg," ".gif," ".bmp," ".ico" or some other format that is known in the art. The second area 508 may be located separately from the first area 502. The second area 508 may also be located proximately to the first area 502, and it may overlap into the first area 502. In an exemplary embodiment, a part of the second area 508 is immediately adjacent to the first area 502, while another part of the second area 508 overlaps the first area 502. Second area 508 will not typically be layered over the first area 502 in such a way that menu commands 504 are obscured to the user.

In an embodiment in which the first area is a start menu, the second area 508 may be placed on the outer edge of the start menu (which might be variable in size depending on the number of menu items available to the user). In other embodiments, the second area could be located in a fixed area on the interface 500. For example, the second area could be located on a menu bar that is fixed to some edge of the interface. In yet another embodiment, the second area could "float" with the pointer 512 so that it remains in a fixed position relative to the pointer 512. In still another embodiment, the second area may be located in an area adjacent to the specific menu item that is located under the pointer.

Figure 4:
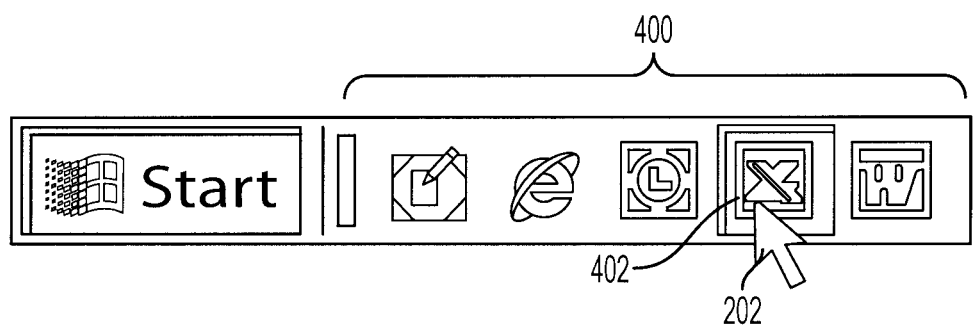
FIG. 4 illustrates a prior art application launcher.

The first area 502 could also be an application launching toolbar as is shown in FIG. 4. In such an embodiment, each application icon is a menu item 504. When a pointer 512 is located over menu item 504, a command is issued to the system. This embodiment provides for an animated icon 510 such as the one shown in FIG. 5 to appear in a second area 508 based on the command issued to the system.

Turning back to FIG. 5a, a pointer 512 is located over a particular menu item, for example, menu item "Contacts" 506, and causes a command to be issued to the system. Based on the location of the pointer, the system issues a command that will either cause animated icon 510 to change its appearance (e.g. animate), or cause a different icon (or animated icon) to be selected from a set of icons based on the location of the pointer (i.e. the current animated icon would disappear and a different icon replaces it). The animated icon 510 may be contextually related to the function application or program launched by selecting the menu item over which the pointer is located.

Figure 7:
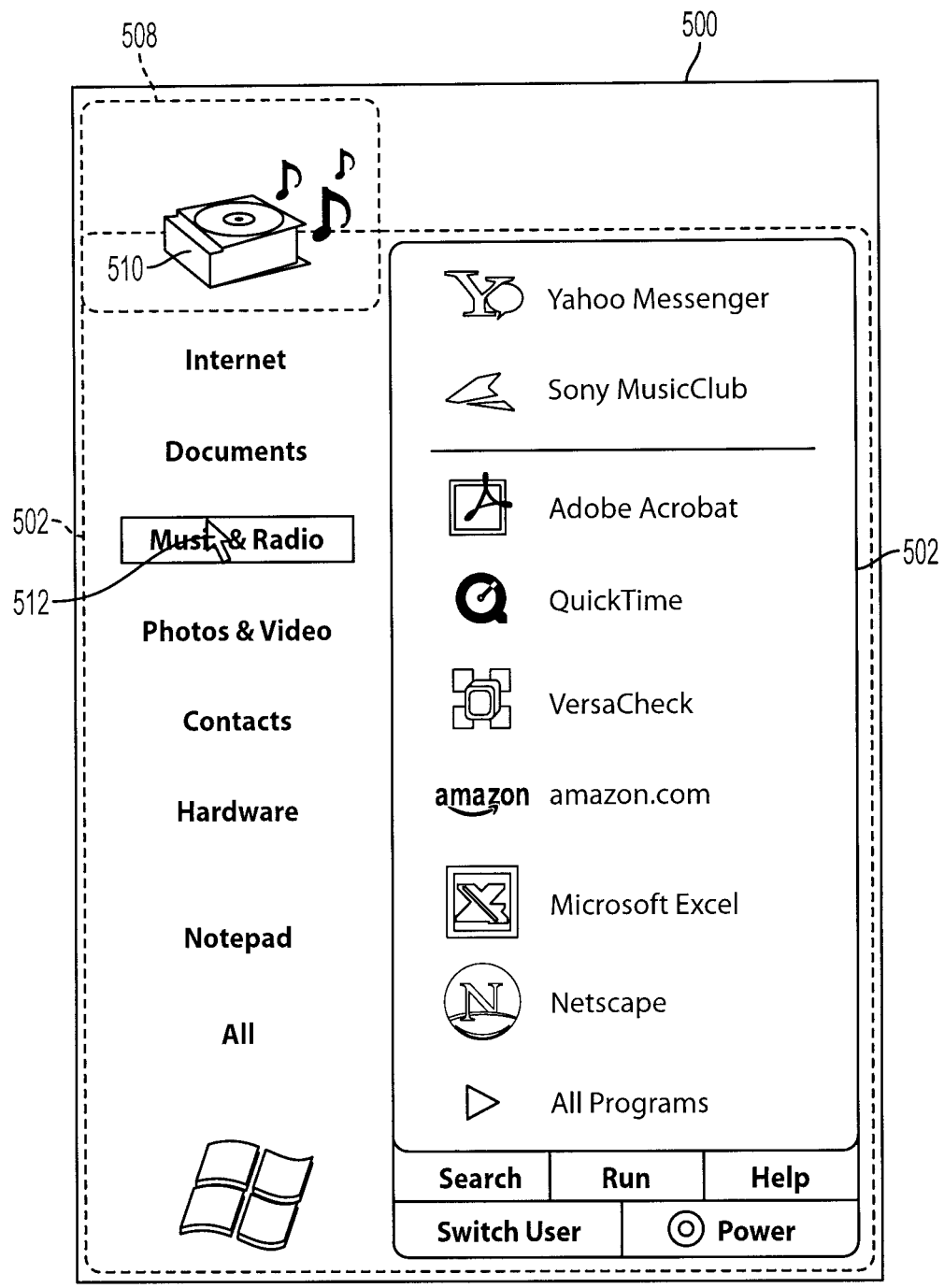
FIG. 7 illustrates a contextually related icon in accordance with aspects of the present invention.

To further illustrate by way of example, in FIG. 5a the pointer is located over a menu item "Contacts" 506. Selecting this menu item will call some routine that gives the user access to his or her stored contact information such as names, address, phone numbers, e-mail address, or some combination thereof. In order to provide a richer user experience, the animated icon 510 is contextually related to the menu item "Contacts" 506 in that it depicts something that represents in some way the function that will be called if the menu item is selected. In this case, a depiction of a generic card organizer filled with business cards similar to well-known card organizers such as Rolodex® or some other card organizer is provided to the user. To further illustrate the contextual relationship between menu items 504 and three dimensional animated icons 510, FIG. 7 shows the pointer hovering over the "Music & Radio" menu selection in the first area 502. The second area 508, has animated icon 510 located within it. Unlike the previous example in which the animated icon took the appearance of a card organizer, in this case the icon is contextually related to a menu selection that pertains to "Music and Radio." Thus, the animated icon 510 is a three-dimensional appearing graphical representation of a stack of compact discs with music emanating from them.

Providing an icon that is contextually related to the menu item provides at least three benefits. First, because the pointer is often somewhat small and can be moved around the screen quickly, it is easy for the user to lose sight of where the pointer 512 is located. Providing the contextual animated icon 510 gives the user a better indication of the location of the pointer. Second, the contextual animated icon 510 also provides the user with an easy to find and visually appealing indicator of what actuating the pointing device will cause to happen at that immediate time. Third, the use of the contextual animated icon 510 can provide for a more compact listing of the menu choices. Because the animated icon 510 provides useful feedback to the user about the menu item over which the pointer is located, the menu items can be made smaller and more compact because their readability may not be as important.

Figure 5C:
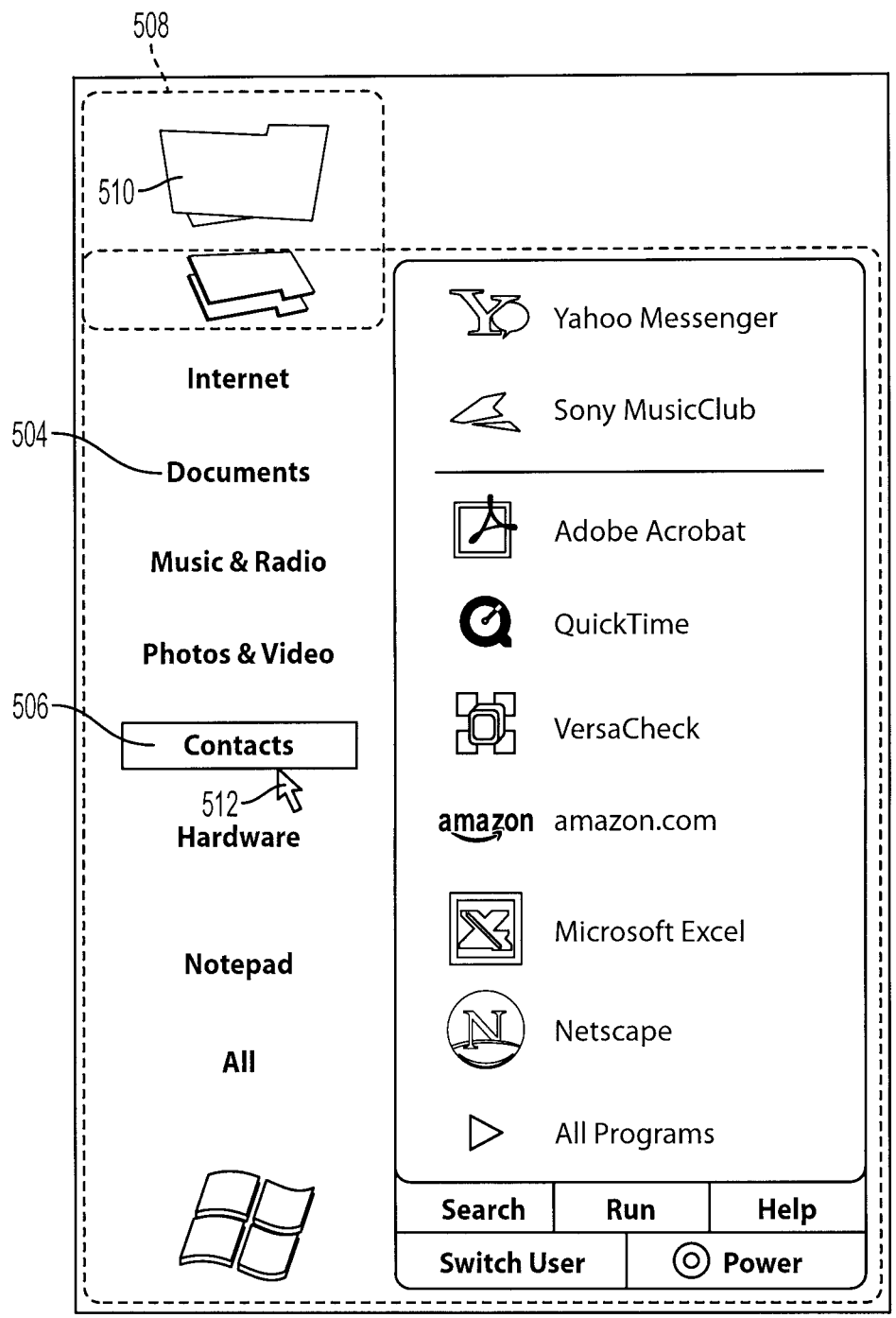
Figure 5D:
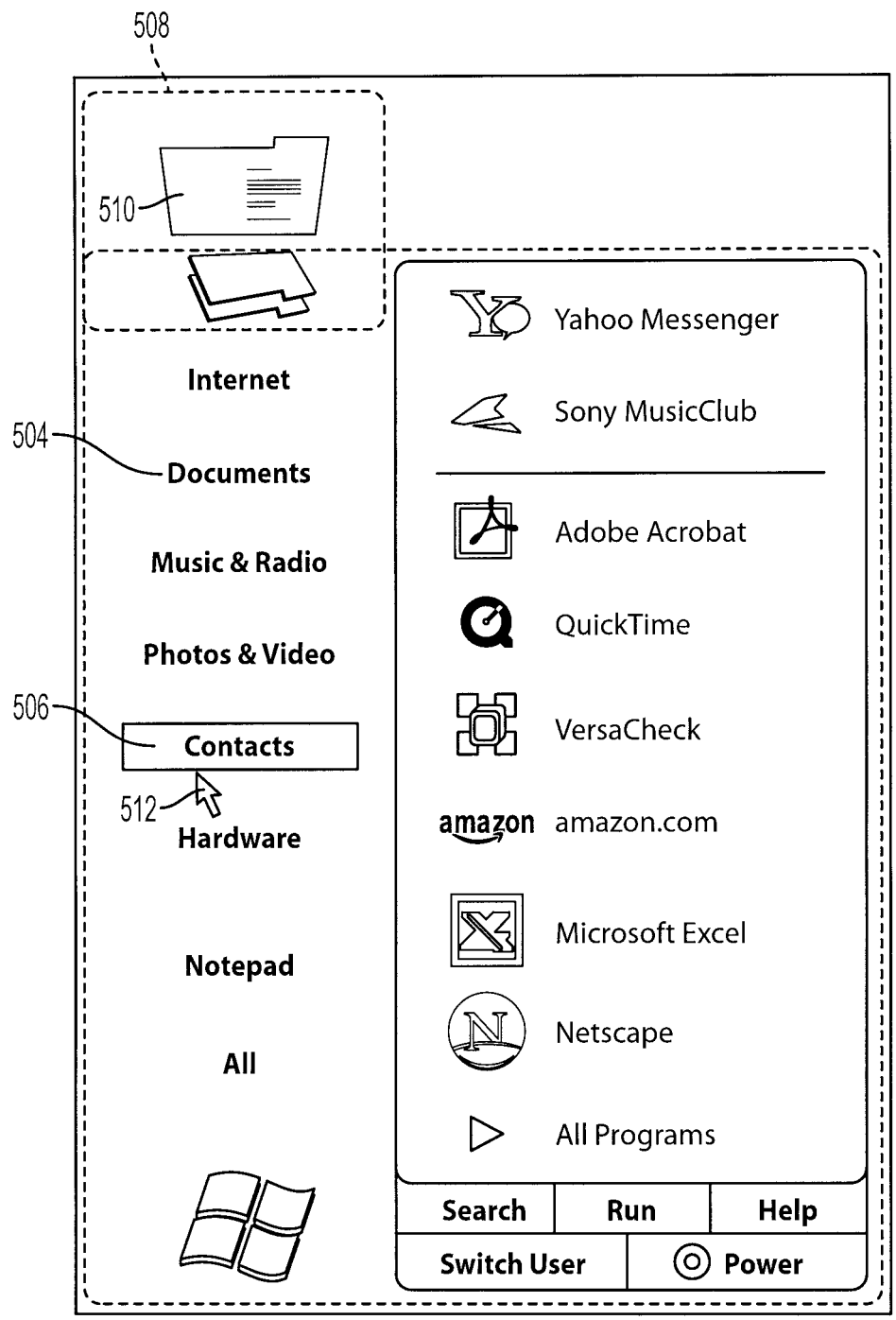

Referring back to FIG. 5b, the animated icon 510 begins to flip its business cards forward in a way that simulates how a person would scroll through a typical card organizer. It should be noted that the cursor 512, still hovers over the menu item "Contacts" 506 while this animation occurs. Turning to FIG. 5c, the animated icon 510 continues to flip its business cards in a way similar to how a person would scroll through a typical card organizer. In FIG. 5d, the animated icon 510 finishes flipping its business cards, and comes to a rest. Prior to coming to a rest, however, the icon moves or rocks side-to-side in such a way that the user can better see the animated icon's 510 simulated three dimensions. Moreover, the rocking motion of the animated icon 510 further calls the icon to the user's attention. Because the icon is contextually related to the menu item that the pointer 512 is hovering over, the user will be able to discern from the appearance of the animated icon 510, the action that will take place if the menu item is selected. As a result, this technique provides to the user an enriched visual experience. In another embodiment of the invention, rather than having the animated icon 510 rock side-to-side, the animated icon may rotate to follow the movement of the pointer. The rotation of the animated icon might not be a predefined series of movements, but rather may be generated in real-time responsive to the movement of the pointer. For example, if the pointer is moved up the user interface, the animated icon 510 may rotate in one direction. If the pointer is moved down, the animated icon 510 may rotate in an opposite direction.

In order to simplify the process of animating the animated icon 510, the animation process may include an introduction animation element that causes the icon to move and flip. This element can be programmed utilizing techniques well known to one of skill in the art such as those used for creating animated graphics interchange format (GIF) files. The animating of the animated icon 510 may further comprise a looping animation element that causes the introduction animation element to repeat its introduction element. The looping animation may be followed by an ending animation that returns the icon back to its original appearance.

In the embodiments described so far, each menu item 502 has been associated with a different animated icon 510 selected from a set of icons. In other embodiments, however, animated icon 510 could be a single animated icon that morphs in appearance based on the location of the pointer over a menu item. Referring to FIG. 5a, when the pointer is located over menu item "Contacts" 506, animated icon 510 is displayed. When the pointer is moved to the "Photos & Video" menu item, rather than changing into a different animated icon, the same animated icon 510 could morph into an appearance that is contextually related to the "Photos & Video" menu section.

Figure 8:
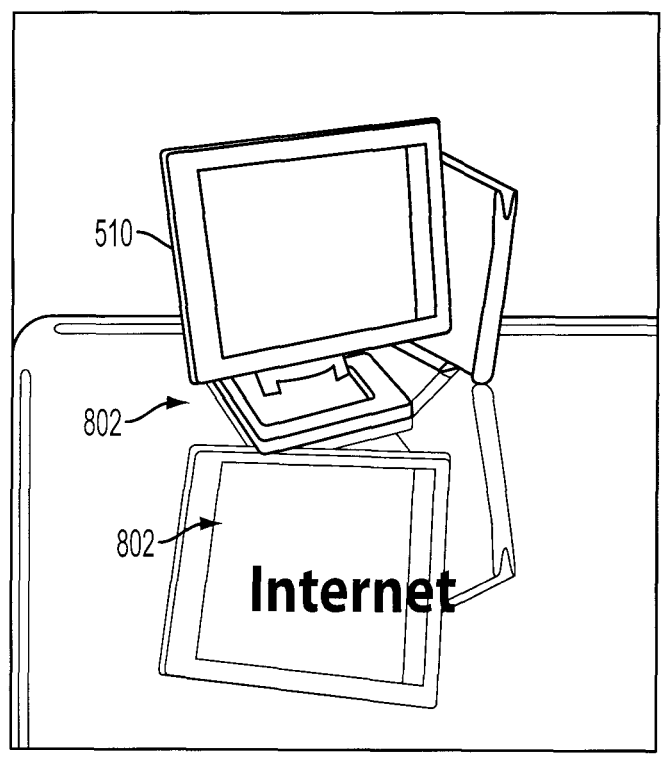
FIG. 8 illustrates a reflecting three-dimensional icon in accordance with an aspect of the invention.

Referring to FIG. 8, animated icon 510 may be situated in such a way that it appears to be hovering over the start menu providing a realistic looking three-dimensional effect. This three dimensional hovering effect can be further enhanced by providing an animated reflection 802 of the animated icon 510 on the start menu. These icon animations can be achieved through various methods that are known to one of skill in the art. As discussed above, many computer graphics software applications have features that enable those of skill in the art to develop three-dimension effects in computer graphics utilizing conventional drawing techniques. In addition, the animated icon 510 could be implemented as a predefined three-dimensional icon object that is integrated into the operating system shell API or located in the shell namespace. As the animated icon rocks or moves from side-to-side as described above, the reflection 802 will rock in a similar (but mirrored) manner.

Figure 6A:
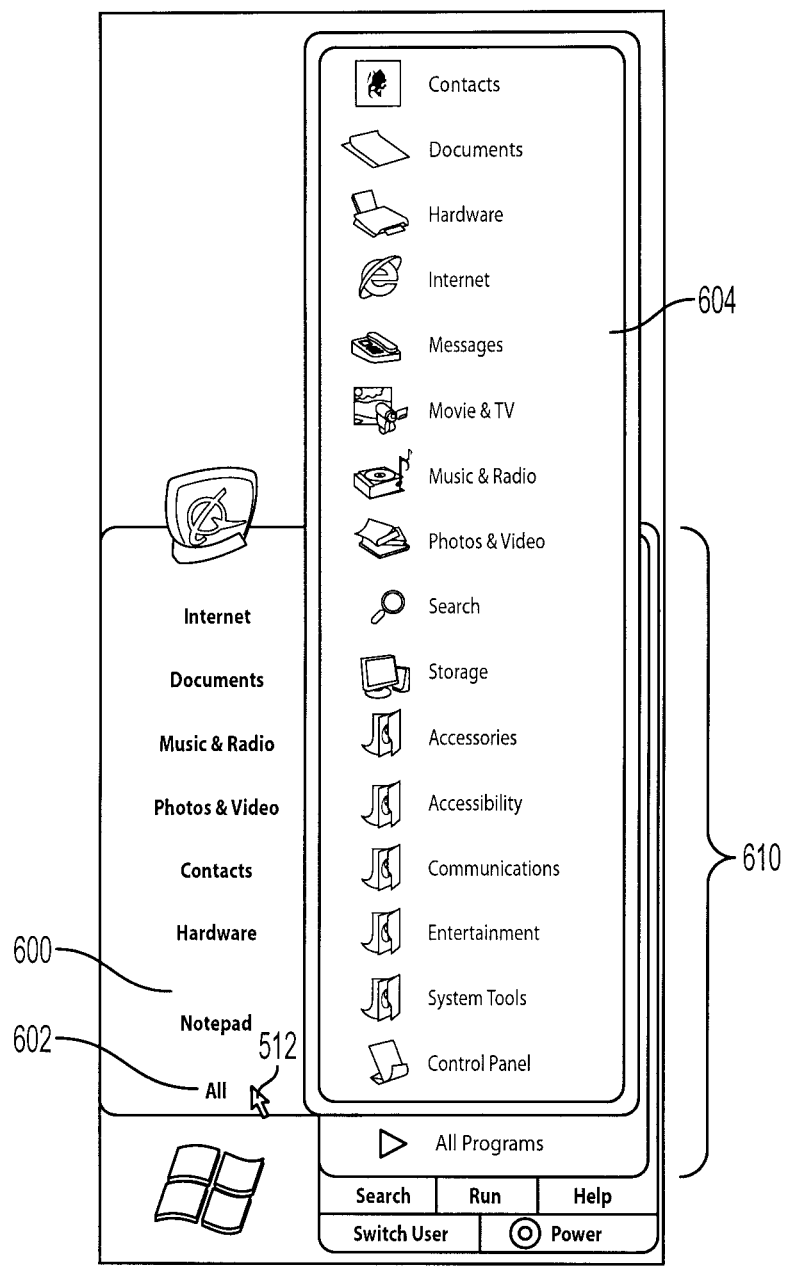
FIG. 6 illustrates a menu in accordance with aspects of the present invention.

Referring to FIG. 6*a*, another aspect of the invention is shown. Here, a computer generated user interface for accepting user input commands has two sections. In one of the sections, each operation that can be called by selecting an item in the first section is an operating system specific function, whereas each operation that can be called by selecting an item in the second section might not necessarily be an operating system function, although it may be. An operating system specific function is a program or function that is included with the distribution of the operating system. Examples of operating system specific functions are configuration utilities, file management utilities, generic text editors, and virtual objects that are part of the operating system shell namespace such as the "My Computer" or "Recycle Bin" icons in Microsoft Windows® operating system. The operating system shell is simply an interface that allows the user to interact with the operating system installed on the computer. A graphical user interface is part of an operating system's shell. A shell namespace organizes the file system and other objects (such as those virtual objects described above) managed by the shell into a single tree-structured hierarchy.

In one exemplary embodiment, the two sections are each part of the start menu. Referring to FIG. 6*a*, the start menu 600 has been activated and the pointer is located over the "All" menu item 602. In some embodiments, this first section will have a first subsection that allows the user to launch more commonly accessed operating system specific items and a second subsection that expands to provide access to all operating system specific functions. Positioning the pointer over the "All" menu item 602 causes the system to issue a command that calls an additional menu 604 that provides menu items for all operating system specific functions. This first section of the start menu provides access only to operating system specific functions and does not include application programs such as those typically installed on the computer subsequent to the installation of the operating system.

Figure 6B:
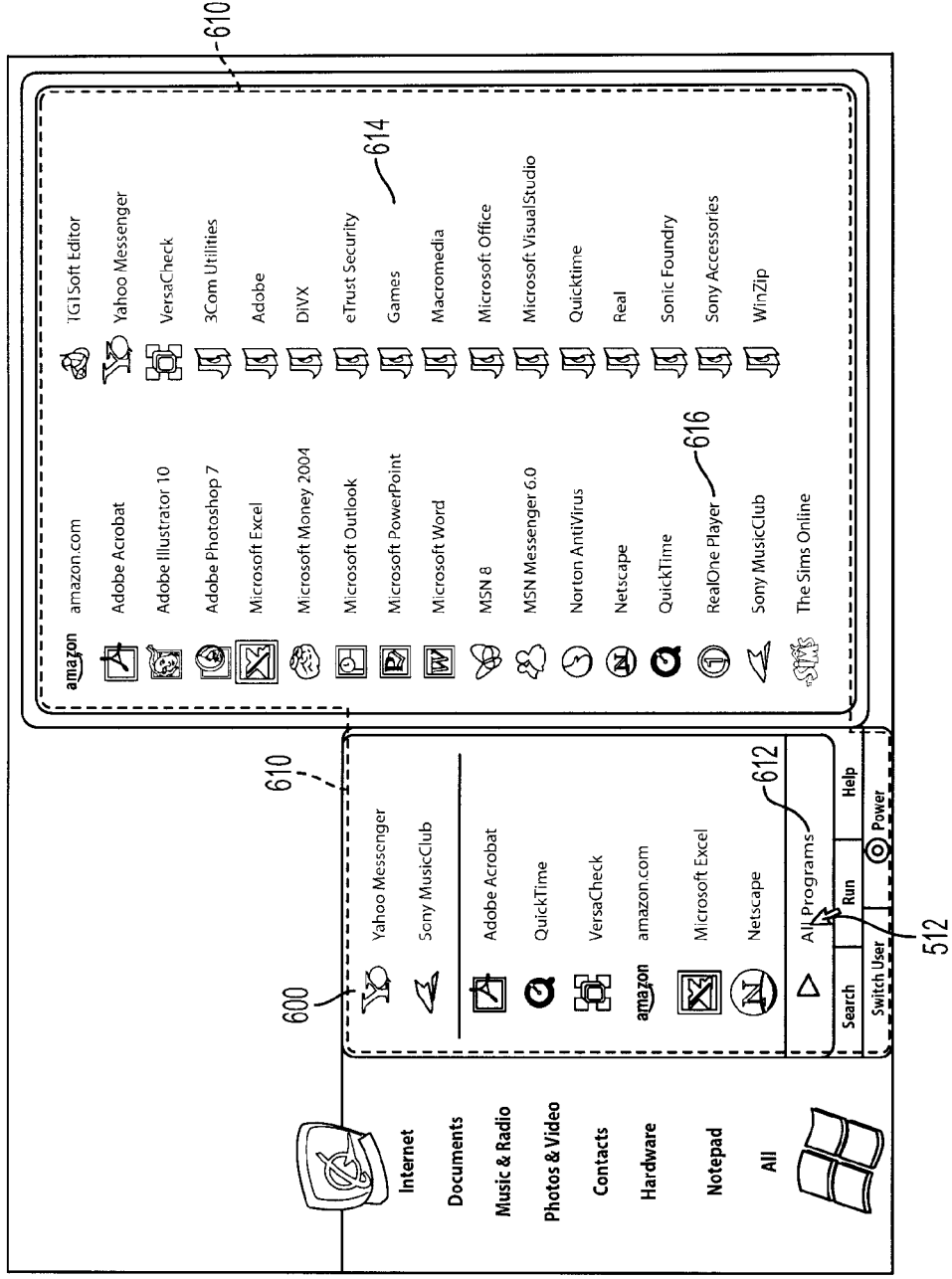

In the layer underneath the additional menu 604 lies a second section of the start menu 610. Referring briefly to FIG. 6*b*, the right side of the start menu 600 is shown with the pointer 512 hovering over the "All Programs" menu item 612. Hovering the pointer over the "All Programs" menu item causes the system to issue a command that causes the second section of the start menu to expand to show the entire second section of the start menu. This second section of the start menu has menu items 616 that are designed to launch or activate application programs. Although an operating system specific function could be placed in this second section of the start menu, there is no requirement that the menu items in this second section be of any particular nature. The second section may include software applications such as office productivity software or some other software. As a result of hovering the pointer 512 over the "All Programs" menu item 612, the second section of the start menu expands to show a much larger assortment of menu items. This expanded area of the second section of the start menu 610 contains menu folders 614 that group related menu items, and other menu items that launch application programs 616.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computer system having processor, memory, and data storage subsystems, and a computer generated graphical user interface (GUI) for accepting user input commands, the computer generated GUI comprising:
    a first area containing a compact listing of menu items, the first area further comprising:
        an operating system (OS) specific function section which provides access only to OS specific functions, and comprises a first OS subsection consisting of commonly accessed OS specific menu items of the computer generated GUI; and
        an application program (AP) specific function section which provides access only to AP specific functions, and comprises a first AP subsection consisting of commonly accessed AP specific menu items of the computer generated GUI and a completely separate second AP subsection that expands to provide access to all AP specific menu items,
        wherein the OS specific function section is grouped completely separately from the AP specific function section; and
    a second area separated from the first area, the second area including an icon selected from a set of icons based on a location of a pointer relative to an associated OS specific menu item, wherein a subsequent selected icon will replace the selected icon upon a subsequent location of the pointer relative to a subsequent associated OS specific menu item;
    wherein the GUI is part of an operating system shell.

2. The computer generated graphical user interface of claim 1 wherein the first area is a start menu.

3. The computer generated graphical user interface of claim 2 wherein the icon is an animated icon.

4. The computer generated graphical user interface of claim 3 wherein the animated icon appears as hovering over at least a portion of the second area.

5. The computer generated graphical user interface of claim 3 wherein the animated icon is three-dimensional in appearance.

6. The computer generated graphical user interface of claim 4, wherein the hovering of the animated icon comprises a three-dimensional appearing object located in the operating system shell.

7. The computer generated graphical user interface of claim 4 wherein the animated icon further appears reflected in the start menu to give a further three-dimensional hovering effect.

8. The computer generated graphical user interface of claim 7 wherein the animated icon appears as rocking from side-to-side.

9. The computer generated graphical user interface of claim 7 wherein the animated icon rotates in response to real-time movement of the pointer.

10. The computer generated graphical user interface of claim 3 wherein the animated icon is contextually related to an item in the start menu over which the pointer is located.

11. The computer generated graphical user interface of claim 10 wherein the contextually related animated icon provides an indication of an action that will occur if the menu item is selected.

12. The computer generated graphical user interface of claim 2 wherein the icon is located immediately adjacent to the start menu.

13. A computer-implemented method using processor, memory, and data storage subsystems for providing visual feedback in a graphical user interface (GUI) having a menu comprising a compact listing of displayed menu items, each menu item being associated with an icon different in appearance from the associated menu item, comprising the steps of:
- receiving a first user input that causes a pointer to be located over an operating system (OS) section, the OS section providing access only to OS specific functions, the OS section consisting of commonly accessed OS specific menu items of the GUI and a single OS menu item expanding access only to all OS specific menu items;
- in response to the first user input, displaying in a first distinct area of the GUI an icon associated with that OS specific menu item located by the first user input, wherein movement of the icon associated with that OS specific menu item is generated in real time in response to movement of the pointer;
- receiving a second user input that causes the pointer to be located over an application program (AP) section, the AP section providing access only to AP specific functions, the AP section consisting of commonly accessed AP specific menu items of the GUI and a single AP menu item expanding access only to all AP specific menu items; and
- in response to the second user input, displaying in a second distinct area of the GUI an icon associated with that AP specific menu item located by the second user input;
- wherein:
  - movement of the icon associated with that AP specific menu item is generated in real time in response to movement of the pointer;
  - the first distinct area and the second distinct area do not overlap the OS or AP menu item located by the first or second user input, respectively;
  - the GUI is part of an operating system shell organized into a tree-structural hierarchy;
  - the associated icon provides an indication of an action that will occur if the displayed OS or AP menu item is selected; and
  - the OS section is grouped completely separately from the AP section.

14. The computer-implemented method of claim 13 wherein the icon is an animated icon.

15. The computer-implemented method of claim 14 wherein the menu is a start menu.

16. The computer-implemented method of claim 15 wherein the animated icon is contextually related to the animated icon's associated menu item in the start menu.

17. The computer-implemented method of claim 14 wherein the displaying step further comprises:
- an introduction animation element that causes the animated icon to move and flip;
- a looping animation; and
- an ending animation that changes the icon back to its original appearance.

18. The computer-implemented method of claim 14 wherein the animated icon is a predefined object type in a shell namespace, wherein the shell namespace organizes a file system of the operating system shell into a single tree-structured hierarchy.

19. One or more computer-readable storage media having computer readable instructions embodied thereon, when executed by a computing device, perform a method of providing visual feedback in a graphical user interface (GUI), the method comprising:
- providing a menu, comprising a compact listing of displayed menu items, wherein each of the displayed menu items is associated with an icon located apart from the associated displayed menu item, the menu further comprising:
  - an operating system (OS) section which provides access only to OS specific functions, the OS section comprising a first OS subsection consisting of commonly accessed OS specific menu items of the GUI and a second OS subsection that expands access only to all OS specific menu items; and
  - an application program (AP) section which provides access only to AP specific functions, the AP section comprising a first AP subsection consisting of commonly accessed AP specific menu items of the GUI and a second AP subsection that expands access only to all AP specific menu items,
  - wherein the OS section is grouped completely separately from the AP section;
- receiving user input that causes a pointer to be located over one of the displayed menu items; and
- in response to the user input, displaying the icon associated with the pointer-located displayed menu item in a distinct area of the GUI;
- wherein the distinct area does not overlap the pointer-located displayed menu item; and
- wherein the GUI is part of an operating system shell.

20. The computer readable storage media of claim 19 wherein the icon is an animated icon.

21. The computer readable storage media of claim 20 wherein the menu is a start menu.

22. The computer readable storage media of claim 21 wherein the animated icon is contextually related to the animated icon's associated menu item in the start menu.

23. The computer readable storage media of claim 20 wherein the displaying step further comprises:
- an introduction animation element that causes the animated icon to move and flip;
- a looping animation; and
- an ending animation that changes the icon back to its original appearance.

24. The computer readable storage media of claim 20 wherein the animated icon is a predefined object type in the operating system shell.

25. One or more computer readable storage media containing computer readable instructions embodied thereon that, when executed by a computing device, provide as part of an operating system shell, a computer generated graphical user interface (GUI) for accepting user input commands, said GUI comprising:
- a pointer for selecting menu items and icons;
- a start menu divided into a compact listing of discrete sections, a first discrete operating system (OS) specific function section that provides access only to OS specific functions consisting of commonly accessed OS specific menu items of the GUI and a single OS menu item expanding access only to all OS specific menu items, the first discrete OS specific function section grouped separately from a second discrete application program (AP) specific function section consisting of commonly accessed AP specific menu items of the GUI and a single AP menu item expanding access only to all AP specific menu items; and
- an animated three-dimensional appearing icon that moves side-to-side so that a user can see the edges rotating, and the animated three-dimensional appearing icon changes appearance based on the OS menu item or the AP menu item over which the pointer is located, wherein the animated three-dimensional appearing icon is displayed in a different, non-overlapping discrete section from the corresponding OS menu item or the AP menu item;

wherein the animated three-dimensional appearing icon provides an animated indication of a first action that will occur if a first OS or AP menu item is selected, and further morphs into a second appearance when the pointer moves over a second OS or AP menu item to provide an animated indication of a second action that will occur if the second OS or AP menu item is selected.

26. The computer readable storage media of claim 25 wherein the three-dimensional appearing icon moves side to side in response to a real-time movement of the pointer.

* * * * *